United States Patent
Palmas et al.

(10) Patent No.: US 9,446,398 B2
(45) Date of Patent: Sep. 20, 2016

(54) STRIPPING VESSEL FOR REMOVING HYDROCARBONS ENTRAINED IN CATALYST PARTICLES

(71) Applicant: UOP LLC, Des Plaines, IL (US)

(72) Inventors: Paolo Palmas, Des Plaines, IL (US); Andrew Jonathan Craig, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 81 days.

(21) Appl. No.: 14/561,781

(22) Filed: Dec. 5, 2014

(65) Prior Publication Data
US 2016/0158741 A1    Jun. 9, 2016

(51) Int. Cl.
*B01J 8/34* (2006.01)
*B01J 38/06* (2006.01)

(52) U.S. Cl.
CPC *B01J 38/06* (2013.01); *B01J 8/34* (2013.01); *B01J 2208/00752* (2013.01); *B01J 2208/00761* (2013.01)

(58) Field of Classification Search
CPC .................................. B01J 8/34; B01J 38/06
USPC .......................................... 422/144; 208/150
See application file for complete search history.

(56) References Cited

U.S. PATENT DOCUMENTS

| | | | |
|---|---|---|---|
| 2,472,502 A * | 6/1949 | Tyson | B01J 8/1881 208/151 |
| 4,364,905 A | 12/1982 | Fahrig et al. | |
| 4,481,103 A | 11/1984 | Krambeck et al. | |
| 5,716,585 A | 2/1998 | Senegas et al. | |
| 6,224,833 B1 | 5/2001 | Rall | |
| 6,680,030 B2 | 1/2004 | Koebel et al. | |
| 6,740,227 B2 | 5/2004 | Hedrick | |
| 7,077,997 B1 * | 7/2006 | Sandacz | B01J 8/0055 422/140 |
| 7,332,132 B2 | 2/2008 | Hedrick et al. | |
| 2005/0205467 A1 * | 9/2005 | Hedrick | C10G 11/18 208/150 |

* cited by examiner

*Primary Examiner* — Huy-Tram Nguyen
(74) *Attorney, Agent, or Firm* — James C. Paschall

(57) ABSTRACT

A stripping vessel for removing hydrocarbons from a catalyst and a process for removing hydrocarbons from a catalyst. In an FCC unit, the stripping vessel includes first and second stripping sections. The first stripping section includes at least one grid having a plurality of interesting members and openings therebetween. The second stripping section includes structured packing such as a plurality of ribbons. The one or more grids are spaced from the structured packing, and from each other, so as to minimize the accumulation of catalyst within the stripping vessel, preferably between about 0.91 m (3 ft) to about 1.5 m (5 ft).

20 Claims, 4 Drawing Sheets

STRIPPING VESSEL FOR REMOVING HYDROCARBONS ENTRAINED IN CATALYST PARTICLES

FIELD OF THE INVENTION

This invention relates generally to a vessel used to recover hydrocarbons from a catalyst, and more particularly to a vessel use to recover hydrocarbons entrained in a catalyst and a process for recovering same.

BACKGROUND OF THE INVENTION

A variety of processes contact finely divided particulate material with a hydrocarbon containing feed under conditions wherein a fluid maintains the particles in a fluidized condition to effect transport of the solid particles to different stages of the process. Fluid catalytic cracking (FCC) is a prime example of such a process that contacts hydrocarbons in a reaction zone with a catalyst composed of finely divided particulate material. The hydrocarbon feed fluidizes the catalyst and typically transports it in a riser as the catalyst promotes the cracking reaction. As the cracking reaction proceeds, substantial amounts of hydrocarbon, called coke, are deposited on the catalyst.

A high temperature regeneration, typically within a regeneration zone, burns coke from the catalyst by contacting the catalyst with an oxygen-containing stream that again serves as a fluidization medium. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A majority of the hydrocarbon vapors that contact the catalyst in the reaction zone are separated from the solid particles by various separation methods within the reaction zone such as ballistic and/or centrifugal separation. However, the catalyst particles employed in FCC processes typically have a large surface area, which is due to a great multitude of pores located in the particles. As a result, the catalytic materials may retain hydrocarbons within their pores, upon the external surface of the catalyst, as well as within the spaces between individual catalyst particles. Although the quantity of hydrocarbons retained on each individual catalyst particle may be very small, the vast amount of catalyst and the high catalyst circulation rate which is typically used in modern FCC processes results in a significant quantity of hydrocarbons being withdrawn from the reaction zone with the catalyst.

Therefore, it is common to remove, or strip, hydrocarbons from spent catalyst prior to passing it into a regeneration zone. Improved stripping brings economic benefits to the FCC process by reducing "delta coke." Delta coke is the weight percent of the coke on spent catalyst less the weight percent of the coke on regenerated catalyst. Reducing delta coke in the FCC process causes a lowering of the regenerator temperature. Consequently, more of the resulting, relatively cooler regenerated catalyst is required to supply the fixed heat load in the reaction zone. The reaction zone may hence operate at a higher catalyst-to-feed or catalyst-to-oil (C/O) ratio. The higher C/O ratio increases conversion which increases the production of valuable products. Thus, improved stripping results in improved conversion.

The most common method of stripping hydrocarbons from the catalyst utilizes a stripping gas, usually steam, passed through a stream of catalyst, counter-current to the direction of flow of the catalyst. Such steam stripping operations, with varying degrees of efficiency, remove the hydrocarbon vapors which are entrained with the catalyst and adsorbed on the catalyst.

Various prior art designs for stripping vessels are disclosed in U.S. Pat. Nos. 4,481,103, 4,364,905, 5,716,585, 6,680,030, and 6,224,833. A more modern and improved stripping vessel is disclosed in U.S. Pat. No. 7,332,132 which utilizes a structured packing section that comprises a plurality of ribbons. More specifically, the ribbons comprise angular bends and openings between adjacent edges to allow catalyst to flow uniformly into a stripping vessel with relatively small occasion of clogging by spalling coke deposits.

Often a refiner or processor may utilized newer designs for internal equipment within existing stripping vessels. The use of the existing stripping vessels allows the refiner or processor to minimize capital expenditures while utilizing improvements in the refining and processing industry to increase conversions and yields. For example, it is possible to include the newer and more efficient structured packing sections in existing FCC stripping vessels.

In existing FCC stripping vessels which have been reconfigured to include structured packing, since the structured packing may occupy less vertical space within the vessel, there may be a large distance between the structure packing and the inlet to the stripping section. If unobstructed, the catalyst level above the packing can sometime be excessive, greater than 0.91 m (3 ft), and in some cases as much as 4.5 m (15 ft) or greater. If this space is left devoid of equipment, the catalyst may accumulate which requires a refiner to maintain a higher catalyst inventory.

Additionally, the over accumulation of catalyst can result in catalyst compression leading to gas bypassing where the rising steam will channel through the stripping vessel without entering into an emulsion phase with the catalyst to remove the entrained hydrocarbons. This leads to a reduction in stripping efficiency and hydraulic issues in, for example, the reactor, the stripping vessel, and the spent catalyst standpipe.

Therefore, there remains a need for an effective and efficient design for a stripping vessel that includes structured packing and minimizes the risk of channeling and mal-distribution of the catalyst and stripping medium vapors.

SUMMARY OF THE INVENTION

It has been discovered that by utilizing a grid in a space above a structured packing section, the over accumulation of catalyst within the stripping vessel can be minimized. The number of grids required is preferably determined by a maximum spacing between grids before over accumulation and gas bypassing occurs With such a grid and/or the preferred spacing above the structured packing, the catalyst compression and mal-distribution in the stripping vessel can be minimized without requiring a large amount of additional equipment and without negatively impacting the flow of catalyst and vapor.

Therefore in a first aspect of the present invention, the invention may be generally characterized as providing a stripping vessel for removing hydrocarbons from catalyst. Broadly, the stripping vessel comprises an inlet configured to receive a stream of spent catalyst particles, a first stripping section, a second stripping section, and an outlet. At least some of the spent catalyst particles comprise entrained hydrocarbons. The first stripping section includes at least one grid, and each grid includes at least one opening to allow catalyst to pass there though. The second stripping section includes a structured packing comprised of a plurality of ribbons. The at least one grid in the first stripping section is spaced from the structured packing of the second stripping section so as to minimize an accumulation of catalyst on top of stripping sections. The outlet is configured to pass catalyst particles from the stripping vessel.

In at least one embodiment of the present invention, the stripping vessel further comprises at least one inlet for a stripping fluid. It is contemplated that the inlet for stripping fluid is disposed below the second stripping section.

In one or more embodiments of the present invention, the stripping vessel further comprises an internal riser.

In various embodiments of the present invention, the at least one grid in the first stripping section includes a plurality of openings to allow catalyst there through.

In some embodiments of the present invention, the spacing between the at least one grid in the first stripping section and the structured packing in the second stripping section is between approximately 0.91 m (3 ft) to about 1.5 m (5 ft). It is contemplated that the stripping vessel further comprises a second grid in the first stripping section, and the second grid is disposed above the at least one grid. A spacing between the at least one grid and the second grid in the first stripping section is between approximately 0.91 m (3 ft) to about 1.5 m (5 ft).

In various embodiments of the present invention, the first stripping section comprises a plurality of grids spaced apart from each other. It is contemplated that the spacing between adjacent grids in the first stripping section is at least 0.91 m (3 ft). It is also contemplated that a number of grids in the first stripping section is dependent on a distance between a top of the first stripping section and a top of the second stripping section, such that the grids in the first stripping section are spaced apart at least 0.91 m (3 ft) and no more than 1.5 m (5 ft).

In at least one embodiment, the first stripping section is disposed above the second stripping section. It is further contemplated that the first stripping section is disposed below the second stripping section.

In a second aspect of the present invention, the invention may be generally characterized as a process for stripping hydrocarbons from a catalyst by: passing a stream of catalyst particles to a stripping vessel, wherein at least some of the catalyst particles comprise entrained hydrocarbons; passing catalyst particles through a first stripping section of the stripping vessel, the first stripping section including at least one grid; passing catalyst through a second stripping section of the stripping vessel, the second stripping section comprising structured packing; and, stripping hydrocarbons from the catalyst particles in at least one of the first stripping section and the second stripping section with a stripping fluid. The at least one grid in the first stripping section comprises a plurality of openings for allowing catalyst to pass through the at least one grid.

In at least one embodiment of the present invention, the at least one grid in the first section extends across an entire horizontal cross section of the first stripping section.

In some embodiments of the present invention, the at least one grid comprises plurality of generally sector shaped sections. It is contemplated that the generally sector shaped sections are separated from adjacent sections by a gap.

In at least one embodiment of the present invention, the process also includes passing a stripping fluid into the stripping vessel.

In at least one embodiment of the present invention, the process also includes recovering catalyst particles from the stripping vessel after the catalyst particles have passed through the second stripping section of the stripping vessel.

In one or more embodiments of the present invention, at least one grid in the first section is spaced from the structured packing in the second stripping section by a distance of at least 0.91 m (3 ft).

In one or more embodiments of the present invention, all of the grids in the first section are spaced apart from each other by a distance between 0.91 m (3 ft) to 1.5 m (5 ft).

In some embodiments of the present invention, the stripping vessel includes a riser configured to transport catalyst particles through the stripping vessel. It is contemplated that the riser is disposed within the vessel so as to create an annulus and wherein the first stripping section and the second stripping section are disposed with the annulus.

DETAILED DESCRIPTION OF THE DRAWINGS

In the drawings of the present invention, one or more embodiments are shown in which like numerals denote like elements and in which.

DETAILED DESCRIPTION OF THE INVENTION

Figure 1:
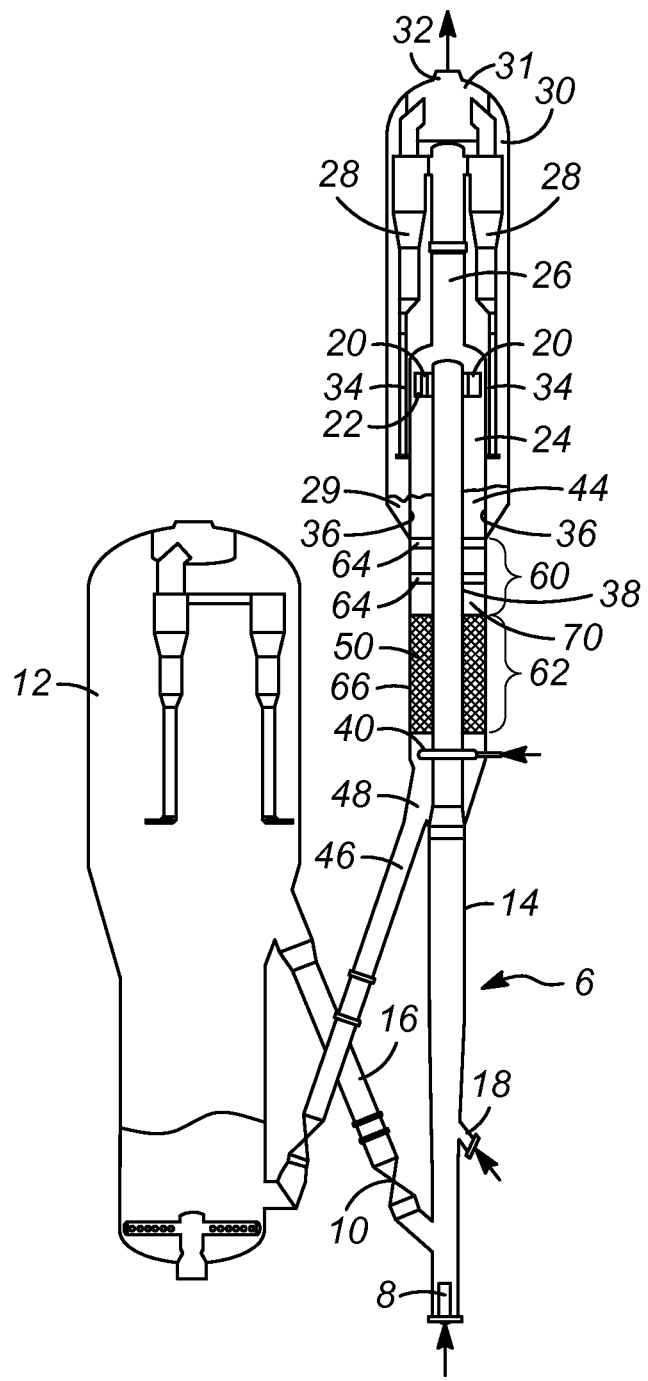
FIG. 1 shows a sectional elevation view of an FCC reactor and stripping vessel arrangement in which the present invention may be incorporated.

As discussed above, a design for a stripping vessel has been developed in which a grid or grids are disposed apart from a section of structure packing. The grid(s) will distribute catalyst that flows downward through the vessel, countercurrent to a stripping medium. The grids(s) will occupy the empty space above the inlet of the vessel to avoid over accumulation of the catalyst. It is contemplated that such a design is especially applicable to an FCC process and FCC process unit that is being retrofitted to include newer and more efficient stripping sections. The grids will occupy the empty space above or below the stripping section with structure packing and minimize the over accumulation of the catalyst.

With reference to the attached drawings, one or more embodiments of the present invention will now be described with the understanding that these embodiments are merely exemplary of the aspects and principles of the present invention.

The present invention comprises a stripping vessel and a process of stripping entrained hydrocarbons from catalyst used in an FCC process. As will be appreciated, the typical feed to an FCC process unit is a gas oil such as a light or vacuum gas oil. Other petroleum-derived feed streams to an FCC process unit may comprise a diesel boiling range mixture of hydrocarbons or heavier hydrocarbons such as reduced crude oils. It is preferred that the feed stream consists of a mixture of hydrocarbons having boiling points, as determined by the appropriate ASTM test method, above about 230° C. (446° F.) and preferably above about 290° C. (554° F.), and most preferably in the range of 343° to 552° C. (650° to 1025° F.).

An FCC process unit generally comprises a reaction zone and a catalyst regeneration zone. In the reaction zone, a feed stream is contacted with a finely divided fluidized catalyst maintained at an elevated temperature and at a moderate positive pressure. In the context of the present invention, contacting of feed and catalyst may take place in a riser conduit, or it may occur in any other effective arrangement such as the known devices for short contact time contacting. In the case of a riser, it comprises a principally vertical conduit as the main reaction site, with the effluent of the conduit emptying into a large volume process vessel containing a solids-vapor separation device. The products of the reaction are separated from a portion of catalyst which falls downwardly. A stripping vessel usually receives the spent catalyst to remove hydrocarbons from the catalyst. Catalyst is transferred to a separate regeneration zone after it passes through the stripping vessel.

The rate of conversion of the feedstock within the reaction zone is controlled by regulation of the temperature, activity of the catalyst, and quantity of the catalyst relative to the feed (C/O ratio) maintained within the reaction zone. The most common method of regulating the temperature in the reaction zone is by regulating the rate of circulation of catalyst from the regeneration zone to the reaction zone, which simultaneously changes the C/O ratio. That is, if it is desired to increase the conversion rate within the reaction zone, the rate of flow of catalyst from the regeneration zone to the reaction zone is increased. This results in more catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to an FCC process unit will affect the amount of coke deposited upon the catalyst in the reaction zone. Normally, the higher the molecular weight, Conradson carbon, heptane insolubles, and carbon-to-hydrogen ratio of the feedstock, the higher will be the coke level on the spent catalyst. In addition, high levels of combined nitrogen, such as found in shale-derived oils, will increase the coke level on spent catalyst. The processing of heavier feedstocks, such as deasphalted oils or atmospheric bottoms from a crude oil fractionation unit (commonly referred to as reduced crude) typically results in an increase in some or all of these factors and therefore causes an increase in the coke level on spent catalyst.

The reaction zone, which is normally referred to as a "riser" due to the widespread use of a vertical tubular conduit, is maintained at high temperature conditions which generally include a temperature above about 425° C. (797° F.). The reaction zone is maintained at cracking conditions which include a temperature of from about 480° C. (896° F.) to about 590° C. (1094° F.) and a pressure of from about 100 to 400 kPa (15 to 60 psig), sometimes less than about 140 kPa (20 psig). The C/O ratio, based on the weight of catalyst and feed hydrocarbons entering the bottom of the riser, may range up to 20:1 but is preferably between about 4:1 and about 10:1. Hydrogen is not normally added to the riser, although hydrogen addition is known in the art. On occasion, steam may be passed into the riser. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst can be used if desired. Further information on the operation of FCC reaction zones is known in the art.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Any FCC catalyst can be used for the process. The particles will typically have a size of less than 100 microns. The catalyst which is being withdrawn from the regeneration zone is referred to as "regenerated" catalyst. As previously described, the catalyst passed to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 600° C. (1112° F.) to about 800° C. (1472° F.). The operation of FCC regeneration zones is also well known in the art.

Generally, the catalyst regeneration zone may be operated at a pressure of from about 70 to 400 kPa (10 to 60 psig). The spent catalyst being charged to the regeneration zone may contain from about 0.2 to about 2.0 wt % coke. This coke is predominantly comprised of carbon and can contain from about 3 to 12 wt % hydrogen, as well as sulfur and other elements. The oxidation of coke will produce carbon dioxide, carbon monoxide, and water. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 300 kg/m$^3$ (18.7 lb/ft$^3$). In a similar manner, the term "dense phase" is intended to mean that the catalyst/gas mixture has a density equal to or more than 300 kg/m$^3$ (18.7 lb/ft$^3$). Representative dilute phase operating conditions often include a catalyst/gas mixture having a density of about 15 to 150 kg/m$^3$ (0.9 to 9.4 lb/ft$^3$).

Turning to FIG. 1, an FCC unit 6 is shown to which the process and apparatus of the present invention may be applied. The FCC unit 6 in FIG. 1 represents only one of many FCC arrangements to which this invention can be applied.

In the FCC unit 6 of FIG. 1, a regenerator standpipe 16 transfers catalyst from a regenerator 12 at a rate regulated by a slide valve 10. A fluidization medium from a nozzle 8 transports catalyst upwardly through a lower portion of a riser 14 at a relatively high density until a plurality of feed injection nozzles 18 (only one is shown) inject feed across the flowing stream of catalyst particles. The resulting mixture continues upward through an upper portion of the riser 14 until at least two disengaging arms 20 tangentially discharge the mixture of gas and catalyst through openings 22 from a top of the riser 14 into a disengaging vessel 24 that effects separation of gases from the catalyst. Most of the catalyst discharged from openings 22 falls downwardly in the disengaging vessel 24 into a bed 44. A transport conduit 26 carries the separated hydrocarbon vapors with entrained catalyst to one or more cyclones 28 in a reactor or separator vessel 30. The cyclones 28 separate spent catalyst from the hydrocarbon vapor stream. A collection chamber 31 gathers the separated hydrocarbon vapor streams from the cyclones for passage to an outlet nozzle 32 and into a downstream fractionation zone (not shown).

Diplegs 34 discharge catalyst from the cyclones 28 into a bed 29 in a lower portion of the disengaging vessel 24 which pass through ports 36 into the bed 44 in the disengaging vessel 24. Catalyst and adsorbed or entrained hydrocarbons pass from the disengaging vessel 24 into a stripping vessel 38 across ports 36. Catalyst from openings 22 separated in the disengaging vessel 24 passes directly into the stripping vessel 38. Hence, the inlets to the stripping vessel 38 include openings 22 and ports 36. In order to facilitate hydrocarbon removal, the stripping vessel 38 includes a first stripping section 60 and a second stripping section 62. The first stripping section 60 includes at least one grid 64 having at least one opening to allow catalyst to pass there through.

Figure 2:
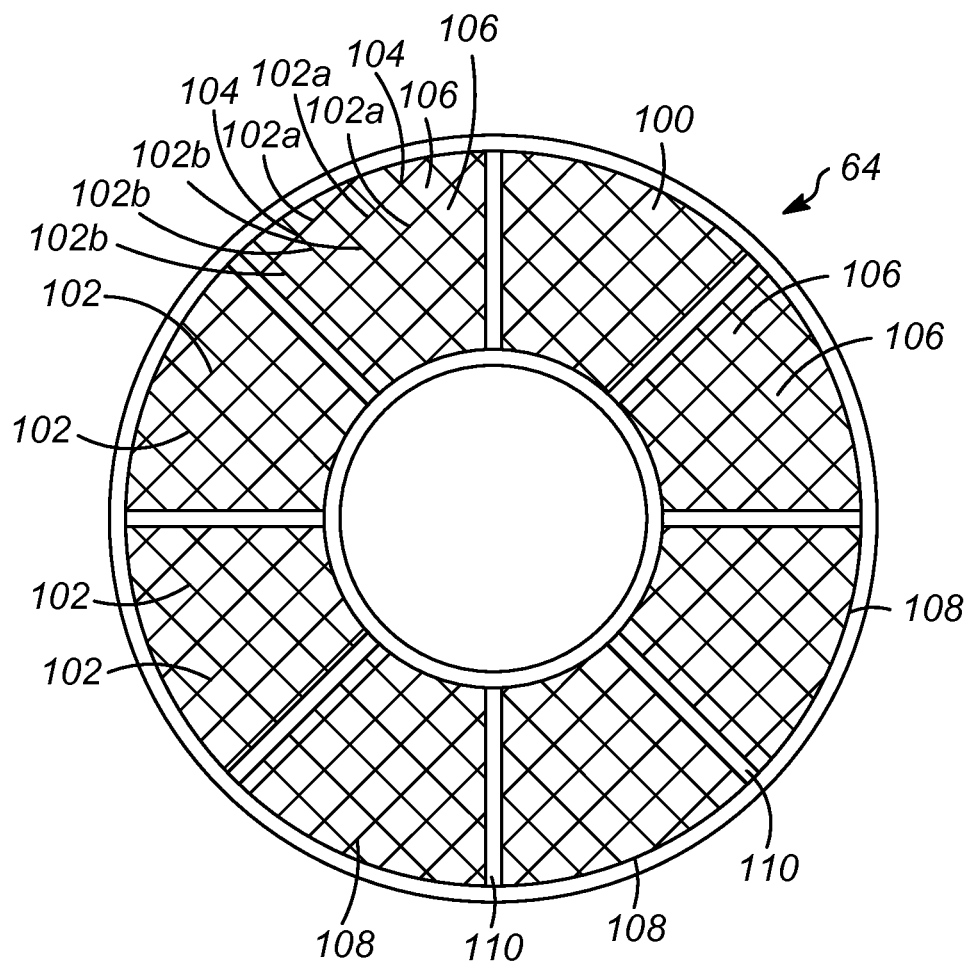
FIG. 2 shows an embodiment of a grid used in one or more embodiments of the present invention.
Figure 3:
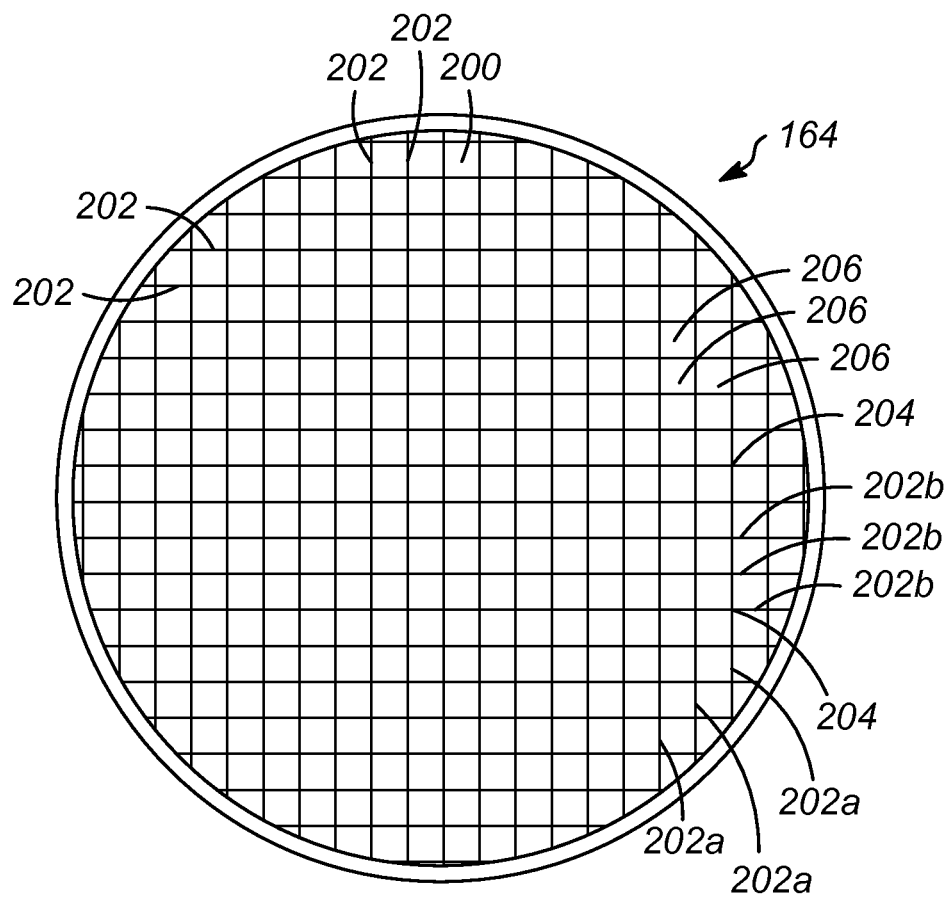
FIG. 3 shows another embodiment of a grid used in one or more embodiments of the present invention; and, FIG. 4 shows structure packing used in one or more embodiments of the present invention.

A preferred design for the grids 64 is disclosed is shown in FIGS. 2 and 3. In both FIGS. 2 and 3, the grids 64, 164 comprise grating 100, 200 or a series of elongate strips 102, 202 with a first plurality of the strips 102*a*, 202*a* running in a first direction and a second plurality of the strips 102*b*, 202*b* running in a second direction perpendicular to the first direction. Between the intersections 104, 204 of the various strips 102*a*, 102*b*, 202*a*, 202*b* are a plurality of openings 106, 206. In stripping vessels in which there is an internal riser (such as the stripping vessel 38 depicted in FIG. 1), both the first stripping section 60 and the second stripping section 62 may be disposed in an annulus 70 between the riser 14 and a shell 66 of the stripping vessel 38. In such configurations, the grid(s) 64 in the first stripping section 60 may comprise a plurality of generally sector shaped sections 108 as shown in FIG. 2. In some embodiments, the sector shaped sections 108 are spaced apart from each other by a gap 110. Other configurations are also contemplated. For stripping vessels in which the riser is external (not shown), the grids 164, as shown in FIG. 3, may comprise a grating 200 that extends over the almost all of or the entire horizontal cross section of the stripping vessel 38. Although not depicted as such, the grating 100 may also comprise sections that are separated by a gap. For example, other preferred grids are disclosed in U.S. Pat. Nos. 6,680,030 and 7,077,997, the entirety of both of these applications is incorporated herein by reference.

Figure 4:
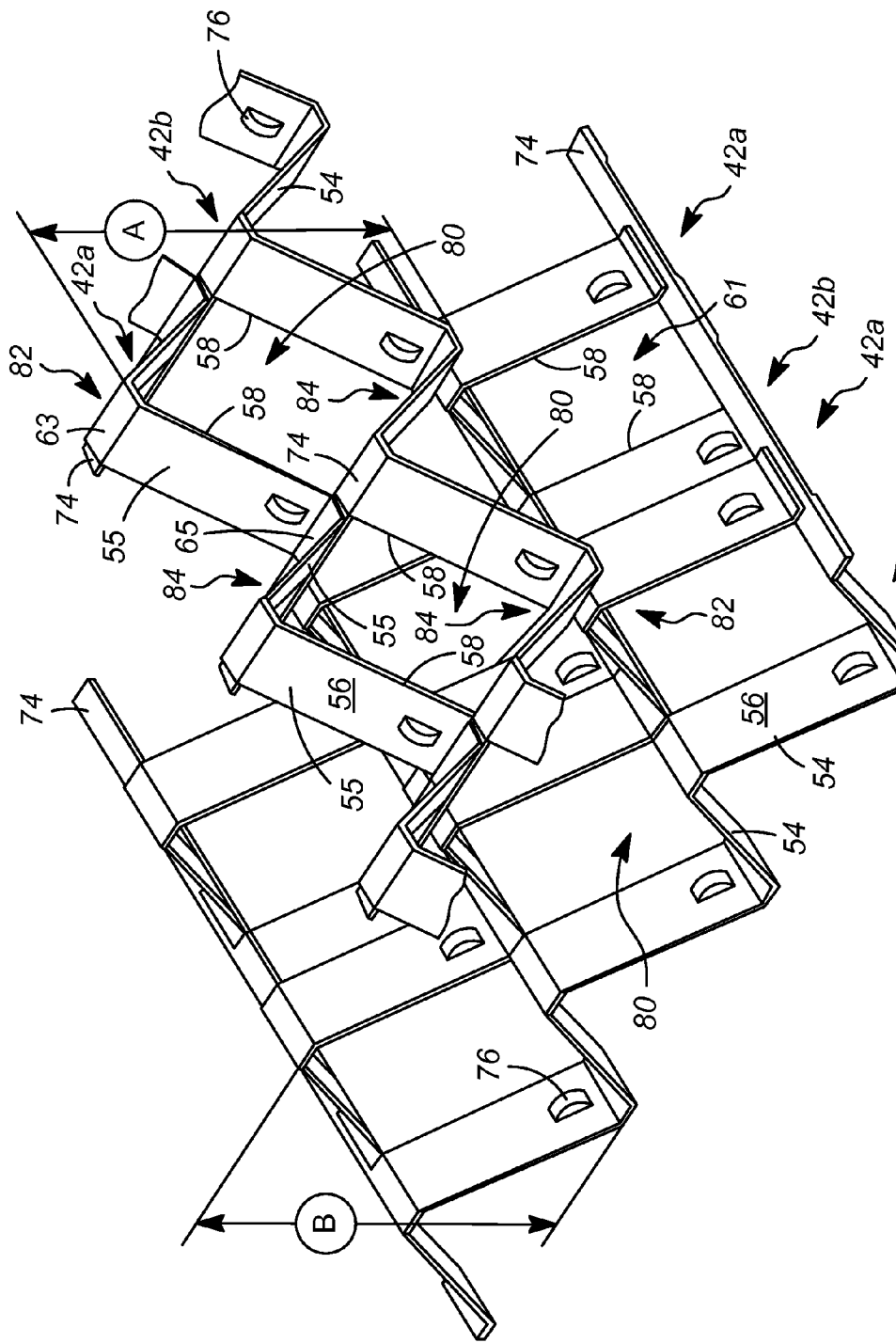

Returning to FIG. 1, the second stripping section 62 comprising a structured packing 50. In one embodiment, the structured packing 50 comprises a plurality of ribbons 42*a*, 42*b*. As shown in FIG. 4, each ribbon 42*a*, 42*b* may comprise bands 54 configured in undulating peaks 82 and valleys 84. Each band 54 includes a face 56 that obstructs passage of fluid and catalyst. In a preferred embodiment, the bands 54 include laterals 55 arranged to provide peaks 82 at an upper landing 63 and valleys 84 at a lower landing 65, but the peaks 82 and valleys 84 may be provided at the apex of a joint of just two bands 54. Each layers A, B includes paired ribbons 42*a*, 42*b*. The lower landings 65 in upper ribbon 42*a* meet the upper landings 63 of the lower ribbon 42*b*. A stabilizing strip 74 may be disposed between the upper landing 63 and the lower landing 65. If the paired ribbons 42*a*, 42*b* are cut out of a common piece of metal, a stabilizing strip 74 may be obviated. The ribbon 42*a* is disposed at a phase that is 90° out of phase to the phase of the paired ribbon 42*b*. Other phase relationships may be used.

Moreover, the axial spacing of a ribbon 42*a* is offset from the axial spacing of its paired ribbon 42*b*. Consequently, the edges 58 of the ribbon 42*a* and the edges 58 of the ribbon 42*b* may be parallel and may define a plane there between. The edges 58 of the laterals 55 and the landings 63, 65 in ribbon 42*a* and the edges 58 of the laterals 55 and the landings 63, 65 in ribbon 42*b* define openings 80 for the horizontal passage of the rising stripping fluid and the falling catalyst particles. The edges of laterals 55 and landings 63, 65 in alternating upper ribbons 42*a* and alternating lower ribbons 42*b* define openings 61 for the vertical passage of the rising stripping fluid and the falling catalyst particles. These openings 80, 61 are also defined by the faces 56 of the laterals 55 and the upper and the lower landings 63, 65. Dimples 76 may be provided in the bands 54. Although shown in the laterals 55 near the valleys 84, the dimples 76 may be disposed in the lower landings 65. It is also contemplated that the edges 58 of the laterals 55 may be secured to each other in which case the laterals 55 would cross each other. Moreover, although the ribbons 42*a*, 42*b* are preferably stacked horizontally in the second stripping section 62, the ribbons 42*a*, 42*b* may be arranged vertically in the second stripping section 62. Other configurations for the structured packing 50 in the second stripping section 62 may be used. For example, although not depicted as such the ribbons in the second stripping section 62 may include segments with upper and lower tabs extending away therefrom in alternative directions. Such ribbons are disclosed for example in U.S. Pat. No. 7,332,132, the entirety of which is incorporated herein by reference.

Although depicted with the first stripping section 60 and the at least one grid 64 is disposed above the second stripping section 62 and the structured packing 50, it is contemplated (although not shown) that the second stripping section 62 is disposed above the first stripping section 60, and that the structured packing 50 is above the grid(s) 64.

In operation, with reference to FIG. 1, stripping gas such as steam enters a lower portion of the stripping vessel 38 through a distributor 40 and rises counter-current to a downward flow of catalyst through the second section 62 of the stripping vessel 38, and then the first section 60 of the stripping vessel 38, thereby removing adsorbed and entrained hydrocarbons from the catalyst. The hydrocarbons flow upwardly through and are ultimately recovered with the steam by the cyclones 28. The distributor 40 distributes the stripping gas around the circumference of the stripping vessel 38. The stripping gas removes the entrained hydrocarbons from the spent catalyst, and rises up through the stripping vessel 38. The spent catalyst leaves the stripping vessel 38 through a port 48 of a conduit 46 and passes into the regenerator 12. The catalyst is regenerated in the regenerator 12 as is known in the art and sent back to the riser 14 through the regenerator standpipe 16.

In order to control the size and distribution of the catalyst bed 44 above the second stripping section 62 of the stripping vessel 38, the at least one grid 64 is preferably spaced between about 0.91 m (3 ft) to about 1.5 m (5 ft) from the second stripping section 62. If the first stripping section 60 includes a plurality of grids 64, the grids 64 are preferably each spaced apart from each other between about 0.91 m (3 ft) to about 1.5 m (5 ft). In some embodiments, the spacing between the grid 64 and the second stripping section is at least about 0.91 m (3 ft) and possibly greater than 1.5 m (5 ft). Furthermore, the grid(s) 64 in the first stripping section 60 are most preferably spaced from the second stripping section 62 so as to minimize an accumulation of catalyst on top of the second stripping section 62, which is in some embodiments at least 1.2 m (4 ft), or at least 0.91 m (3 ft) or 0.61 m (2 ft).

Furthermore, in some embodiments of the present invention, the number of grids 64 in the first stripping section 60 will be dependent on the spacing between the top of the second stripping section 62 and the inlets into the stripping vessel 38.

The use of the grids 64 in the first stripping section 60 allows for existing stripping vessels 38 to be retrofitted with more efficient stripping equipment while minimizing catalyst mal-distribution that may occur as a result of excess space above the stripping equipment in the stripping vessel 38. The grids 64 provide a cost efficient solution without negatively impacting the flow of the catalyst, stripping vapors, or recovered hydrocarbons.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A stripping vessel for removing hydrocarbons from catalyst, the stripping vessel comprising:
    an inlet configured to receive a stream of spent catalyst particles, at least some of the spent catalyst particles comprise entrained hydrocarbons;
    a first stripping section, the first stripping section including at least one grid, each grid including at least one opening to allow catalyst to pass there through;
    a second stripping section, the second stripping section including a structured packing comprised of a plurality of ribbons, the at least one grid in the first stripping section being spaced from the structured packing of the second stripping section; and,
    an outlet configured to pass catalyst particles from the stripping vessel.

2. The stripping vessel of claim 1 further comprising:
    at least one inlet for a stripping fluid.

3. The stripping vessel of claim 2 wherein the inlet for stripping fluid is disposed below the second stripping section.

4. The stripping vessel of claim 1 further comprising:
    an internal riser.

5. The stripping vessel of claim 1 wherein the at least one grid in the first stripping section includes a plurality of openings to allow catalyst there through.

6. The stripping vessel of the claim 1, wherein a spacing between the at least one grid in the first stripping section and the structured packing in the second stripping section is between approximately about 0.91 m (3 ft) to about 1.5 m (5 ft).

7. The stripping vessel of claim 6 further comprising:
    a second grid in the first stripping section, the second grid being disposed above the first grid,
    wherein a spacing between the at least one grid and the second grid in the first stripping section is between approximately about 0.91 m (3 ft) to about 1.5 m (5 ft).

8. The stripping vessel of claim 1 wherein the first stripping section comprises a plurality of grids spaced apart from each other.

9. The stripping vessel of claim 8 where the spacing between adjacent grids in the first stripping section is at least about 0.91 m (3 ft).

10. The stripping vessel of claim 9 wherein a number of grids in the first stripping section is dependent on a distance between a top of the first stripping section and a top of the second stripping section, such that the grids in the first stripping section are spaced apart at least about 0.91 m (3 ft) and no more than about 1.5 m (5 ft).

11. A process for stripping hydrocarbons from a catalyst comprising:
    passing a stream of catalyst particles to a stripping vessel, wherein at least some of the catalyst particles comprise entrained hydrocarbons;
    passing catalyst particles through a first stripping section of the stripping vessel, the first stripping section including at least one grid;
    passing catalyst particles through a second stripping section of the stripping vessel, the second stripping section comprising structured packing; and,
    stripping hydrocarbons from the catalyst particles in at least one of the first stripping section and the second stripping section with a stripping fluid,
    wherein the at least one of the grid in the first section comprises a plurality of openings for allowing catalyst to pass through the at least one grid.

12. The process of claim 11 wherein the at least one grid in the first section extends across an entire horizontal cross section of the first stripping section.

13. The process of claim 11 wherein the at least one grid comprises plurality of generally sector shaped sections.

14. The process of claim 13 wherein the generally sector shaped sections are separated from adjacent sections by a gap.

15. The process of claim 11 further comprising:
    passing a stripping fluid into the stripping vessel.

16. The process of claim 11 further comprising:
    recovering catalyst particles from the stripping vessel after the catalyst particles have passed through the second stripping section of the stripping vessel.

17. The process of claim 11 wherein the at least one grid in the first section is spaced from the structured packing in the second stripping section by a distance of at least about 0.91 m (3 ft).

18. The process of claim 11 wherein each grid in the first section are spaced apart from each other by a distance between about 0.91 m (3 ft) to about 1.5 m (5 ft).

19. The process of claim 11 wherein the stripping vessel includes a riser configured to transport catalyst particles through the stripping vessel.

20. The process of claim 19 wherein the riser is disposed within the vessel so as to create an annulus and wherein the first stripping second and the second stripping section are disposed with the annulus.

* * * * *